July 27, 1937.  R. A. POWERS  2,088,139
SPEED LIMIT INDICATING DEVICE
Filed Dec. 23, 1935  2 Sheets-Sheet 1
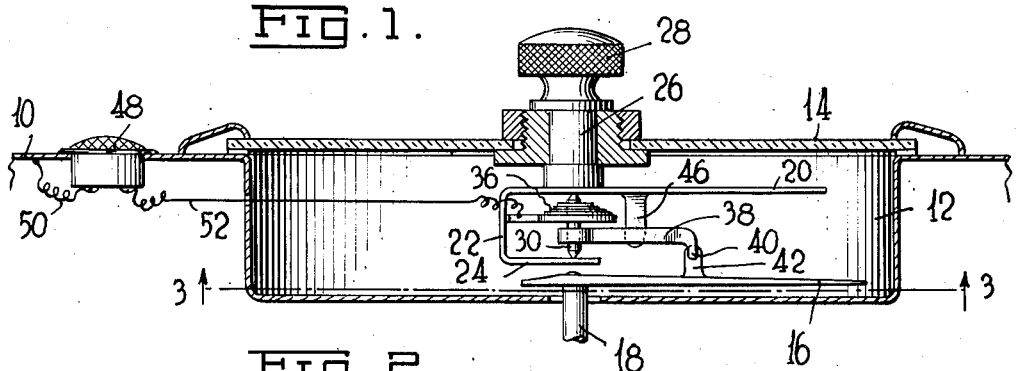
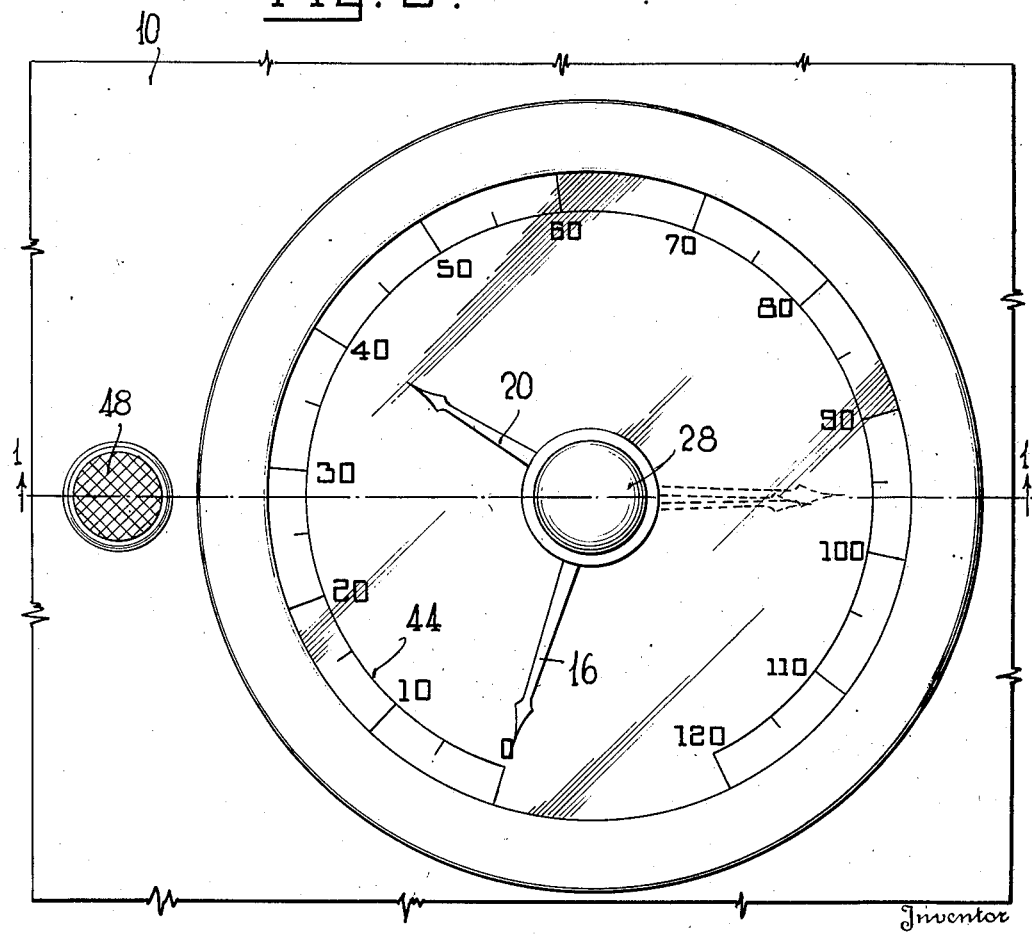
Inventor
Ralph A. Powers,
By Richard L. Underwood
Attorney July 27, 1937.         R. A. POWERS         2,088,139
SPEED LIMIT INDICATING DEVICE
Filed Dec. 23, 1935         2 Sheets-Sheet 2
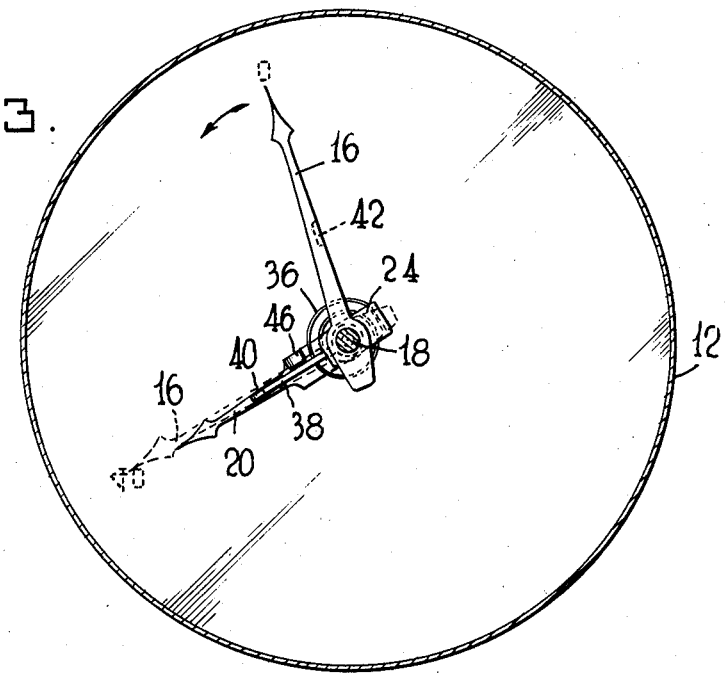
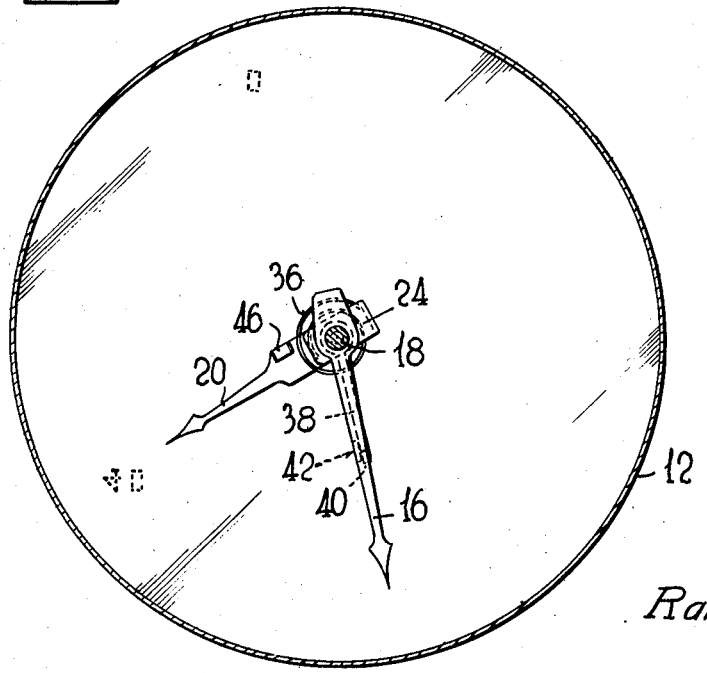
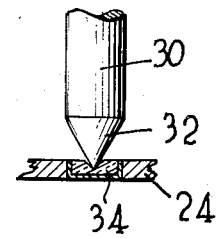
Inventor
Ralph A. Powers,
By Richard L. Underwood
Attorney Patented July 27, 1937

2,088,139

UNITED STATES PATENT OFFICE 2,088,139

SPEED LIMIT INDICATING DEVICE

Ralph A. Powers, Detroit, Mich., assignor to J. J. O'Brien, Grosse Pointe, Mich.

Application December 23, 1935, Serial No. 55,920

2 Claims. (Cl. 200—56)

This invention relates to speed indicating mechanism and has particular reference to a device for indicating clearly when a predetermined speed has been reached.

An object of the invention is to warn the operator of a machine provided with speed indicating mechanism that a predetermined speed has been reached, while at the same time permitting the machine to exceed the predetermined speed without affecting in any way the warning signal already in operation or the operation of the indicating mechanism.

A further object of the invention is to provide a mechanism of this sort which is accurate and sturdy, requiring a minimum of parts and space for installation.

While the device in question has been herein illustrated in connection with an automobile speedometer, it will be apparent that the broad principles involved may be associated in the same general manner with any indicating mechanism provided with a scale having an indicating member movable across the face thereof.

Further objects and advantages will be apparent from the following specification taken in conjunction with the drawings, wherein:

Figure 1 is a section through 1—1 of Figure 2;

Figure 2 is a front elevation illustrating two positions of certain of the parts, those in dotted lines corresponding to the position of such parts as illustrated in Figure 1;

Figure 3 is a section along 3—3 of Figure 1, illustrating a critical arrangement of the parts;

Figure 4 is a section similar to Figure 3 illustrating further the operation of the parts, and Figure 5 is a detail.

Referring now to Figure 1, numeral 10 indicates a conventional automobile dash having mounted therein a speedometer casing 12 provided as usual with a glass face 14 through which the position of the speed indicating needle 16 may be observed. In the embodiment shown herein the said speedometer needle is actuated in customary fashion by a rotatable shaft 18. A U-shaped bracket comprising an arm 20, base 22, and a shorter arm 24 is fixedly positioned to one end of a stub shaft 26, which latter is mounted in the speedometer face coaxially with shaft 18 and is provided with a knurled outer knob 28 by which the bracket may be readily rotated.

A small staff 30, provided with ends tapering as indicated at 32 to a substantial point, is journaled between the arms 20 and 24 of the U-shaped bracket. For greater sensitivity and most complete accuracy in the operation of this device it may be preferable to use jewelled bearings as indicated in Figure 5 at 34. A hair spring 36 is secured at its inner end to the staff 30 and at its outer end to the base 22 of the U-shaped bracket. Contact arm 38 is fixedly secured at one end to staff 30, the other end thereof being provided with a laterally extending lug 40. It will be observed that actuating shaft 18 and staff 30 are in axial alinement with one another and with the axis of stub shaft 26.

The speedometer needle or indicating arm 16 is provided with a laterally extending lug 42 so positioned that as needle 16 swings away from the zero position of the scale 44 it will engage lug 40 and actuate arm 38 in unison with it from the point of engagement. The hair spring 36 is so arranged that it exerts a constant yielding torque through staff 30 urging contact arm 38 toward the zero position of the scale into abutting relation with lug 46 which is positioned on arm 20 of the U-shaped bracket. Contact arm 38 is thus prebiased against lug 46 of contact arm 20.

Lug 46 is adapted to engage contact arm 38 on rotation of the said bracket by means of the knurled knob. Since both ends of spring 36 are rotated when control arm 20 is moved away from zero, it will be seen that the spring tension is increased by winding up the same only when the indicating arm 16 forces contact arm 38 away from its prebiased position against control arm 20. The free end of arm 20 extends out a sufficient distance to be visible through the speedometer glass 14, but terminates short of indicating arm 16, thereby enabling the operator to clearly distinguish between the two even when they lie in substantially the same plane.

From the foregoing it will be seen that arm 20, which will hereinafter be called the control member or arm, may be set to indicate any desired speed by rotating knob 28. The one-way connection between control arm 20 and contact arm 38 carries the latter around against the yielding force exerted by spring 36 to a position corresponding to the speed at which the control arm is set, at the same time permitting further movement of the contact arm across the face of the scale. The one-way connection between indicating arm 16 and contact arm 38 can carry the latter over the full range of the scale, but does not actuate the said contact arm or come in contact with it until it has reached the position indicated by control arm 20.

Lugs 40 and 42 are provided with, or themselves constitute, electrical contacts which complete a circuit including some sort of electric signal device such as lamp 48, which may be mounted in the dash for convenient observation by the operator. A circuit emanates from the usual source through lead 50 to the lamp, out lead 52, and is finally grounded through actuating shaft 18.

Operation of the device may be most clearly understood by particular reference to Figures 3 and 4. The position of the parts indicated in Figure 1, and in dotted line in Figure 2, is somewhat of a random position. The full-line position in Figure 2 and the positions of the parts in Figures 3 and 4 are strictly correlated. The operator, through knurled knob 28, sets the control arm 20 for any speed at which he desires to be warned. Assuming that 40 miles per hour is the desired limit, control arm 20 is rotated until it indicates that speed. Such rotation carries along the contact arm 38 against the yielding pressure of hair spring 36. When this speed has been reached, the lug on indicating arm 16 will contact the lug on contact arm 38, as indicated in Figure 3, thereby closing the circuit through the electric signaling device and warning the operator. The speed may then be increased at will through the full range of the speed indicating mechanism and the circuit through the signaling device will remain closed. Not until indicating arm 16 with its lug 42 drops back of the predetermined position on the scale face will the circuit be broken, thereby dousing the signal.

While various devices for recording the maximum speed attained have been known and used heretofore, as well as devices for operating a warning signal on reaching any predetermined speed, it is not believed that mechanism has ever before been devised wherein the warning signal is operated on reaching a predetermined speed and throughout all speeds thereabove, permitting full range movement of the indicating arm or speedometer needle. As hitherto stated, the gist of this invention resides in mechanism for maintaining an electric circuit throughout all movement of the indicating arm above a predetermined position and the mechanism disclosed herein is only illustrative of certain general principles inherent in the design of such a device. It is obvious that the device may be used for closing an electric circuit, and maintaining the same closed in the manner described, in conjunction with any type of indicating mechanism wherein a movable indicating arm is provided. Various other modifications will be apparent to those skilled in the art and for that reason I wish to limit myself only within the scope of the appended claims.

What I claim is:

1. In combination with a scale, a control member, stop means associated with said member, a contact arm, yieldable means carried by said control member prebiasing said contact arm against said stop means, an indicating arm operable to pick up said contact arm on movement away from zero to thereby establish an electric contact, and means for setting said control member at any predetermined position on the scale.

2. In combination with a scale, a control member movable across the face thereof and adapted to be set at any predetermined position, said member including a stop portion, a contact arm, yieldable means carried by said control member to prebias said contact arm against said stop portion, and an indicating arm movable across the face of said scale, said indicating arm including a portion operable on movement in one direction to pick up said contact arm and carry the same with it against the resistance of said yieldable means to thereby establish an electric contact.

RALPH A. POWERS.